United States Patent
Hämäläinen

(10) Patent No.: US 7,294,168 B2
(45) Date of Patent: Nov. 13, 2007

(54) METHOD FOR PURIFYING THE SOLUTION IN THE HYDROMETALLURGICAL PROCESSING OF COPPER

(75) Inventor: Matti Hämäläinen, Pori (FI)

(73) Assignee: Outotec Oyj, Espoo (FI)

( * ) Notice: Subject to any disclaimer, the term of this patent is extended or adjusted under 35 U.S.C. 154(b) by 540 days.

(21) Appl. No.: 10/492,893

(22) PCT Filed: Oct. 23, 2002

(86) PCT No.: PCT/FI02/00819

§ 371 (c)(1),
(2), (4) Date: Apr. 16, 2004

(87) PCT Pub. No.: WO03/035916

PCT Pub. Date: May 1, 2003

(65) Prior Publication Data

US 2004/0250655 A1    Dec. 16, 2004

(30) Foreign Application Priority Data

Oct. 24, 2001   (FI)   ................................. 20012055

(51) Int. Cl.
*C22B 15/00* (2006.01)
(52) U.S. Cl. ........................................................ 75/743
(58) Field of Classification Search .................. 75/743
See application file for complete search history.

(56) References Cited

U.S. PATENT DOCUMENTS

| | | | |
|---|---|---|---|
| 3,669,650 A | 6/1972 | Elstein et al. ................. 75/101 |
| 3,684,492 A * | 8/1972 | Colombini et al. ........... 75/726 |
| 4,097,271 A | 6/1978 | Swinkeis et al. .............. 75/104 |
| 4,594,132 A * | 6/1986 | Satchell et al. ............. 205/581 |
| 4,632,738 A * | 12/1986 | Beattie et al. ............... 205/347 |
| 5,487,819 A | 1/1996 | Everett ....................... 205/347 |
| 6,007,600 A | 12/1999 | Hyvärinen et al. ........... 75/740 |
| 6,929,677 B2 * | 8/2005 | Hamalainen .................. 75/743 |

OTHER PUBLICATIONS

The Copper Development Assocation (CDA), Copper.org, http://www.copper.org/applications/compounds/other_compounds.html, printed from website Nov. 21, 2006.*

* cited by examiner

*Primary Examiner*—Roy King
*Assistant Examiner*—Kathleen McNelis
(74) *Attorney, Agent, or Firm*—Morgan & Finnegan, L.L.P.

(57) ABSTRACT

The invention relates to the removal of bivalent copper from copper chloride solution in connection with the hydrometallurgical production of copper. In the copper production process, a copper-bearing raw material is leached with a chloride-bearing solution. The copper chloride solution formed in the leaching, which contains both mono- and bivalent copper, undergoes bivalent copper removal at least in part by precipitation, and the copper(I) chloride solution is conduced to further treatment. Precipitation of the bivalent copper occurs as alkaline copper chloride precipitation. The alkaline copper (II) chloride formed is leached as copper(II) chloride either separately or in connection with raw material leaching, and is used in copper raw material leaching.

9 Claims, No Drawings

METHOD FOR PURIFYING THE SOLUTION IN THE HYDROMETALLURGICAL PROCESSING OF COPPER

The invention relates to the removal of bivalent copper from copper chloride solution in connection with the hydrometallurgical production of copper. In the production process of copper, a copper-bearing raw material is leached into a chloride-bearing solution. The copper chloride solution formed in the leaching, which contains both mono- and bivalent copper, undergoes bivalent copper removal at least in part by precipitation, and the copper(I) chloride solution is conducted to further treatment. Precipitation of the bivalent copper takes place as alkaline copper chloride precipitation. The alkaline copper chloride formed is leached as copper(II) chloride either separately or in connection with raw material leaching, and is used in copper raw material leaching.

In U.S. Pat. No. 6,007,600 is described a method for the hydrometallurgical production of copper from a copper-bearing raw material such as copper sulfide concentrate. According to the method, the raw material is leached as counter current leaching with a sodium chloride-copper chloride solution, in several stages, to achieve monovalent copper(I) chloride solution. As there always remains an amount of both bivalent copper chloride and impurities composed of other metals, the solution undergoes bivalent copper reduction and solution purification. The pure cuprous chloride solution is precipitated with the aid of sodium hydroxide into copper oxidule, and the oxidule is further reduced into elemental copper. The sodium chloride solution formed in connection with copper oxidule precipitation is further treated in chlorine alkali electrolysis, from where the chlorine gas and/or chloride solution obtained is used in raw-material leaching, the sodium hydroxide produced in electrolysis is used in oxidule precipitation, and the hydrogen produced is used in the reduction of elemental copper.

In the method described above, the copper chloride solution produced as a result of the raw material leaching also contains some copper(II) chloride, or cupric chloride. The cupric chloride is reduced into monovalent cuprous chloride with the aid of granular copper. The method is often quite practicable, but removal of impurities does not substantially take place in connection with reduction.

The method now developed relates to the further treatment of copper chloride solution produced in the chloride leaching of a copper raw material, such as copper sulfide concentrate. According to this method, at least part of the bivalent copper chloride ($CuCl_2$) contained in the copper chloride solution is removed from the solution by precipitating the copper, with the aid of a suitable reagent as alkaline copper(II) chloride or copper(II) oxychloride. Sodium hydroxide and limestone are at least preferable reagents. The precipitated alkaline copper chloride is leached either separately or it is leached in connection with the raw material leaching, and the copper(II) chloride solution produced is used in raw-material leaching. The copper (I) chloride solution (CuCl), from which the bivalent copper has been removed, is conducted via solution purification to further treatment for elemental copper production.

The copper(II) chloride contained in the copper chloride solution can be precipitated from the solution, for example with the aid of sodium hydroxide. Precipitation takes place according to the following reaction:

$$2CuCl_2+3NaOH=>Cu_2Cl(OH)_3+3NaCl \tag{1}$$

It is preferable to precipitate the produced copper(II) oxychloride again, in oxychloride leaching, by means of which the precipitated $Cu^{2+}$ is leached as copper(II) chloride, $CuCl_2$.

The following reaction takes place in the leaching:

$$Cu_2Cl(OH)_3+3HCl=>2CuCl_2+3H_2O \tag{2}$$

It is clear that leaching does not necessarily require its own process step, but can be performed in connection with copper raw material leaching.

Bivalent copper is well known as a good oxidizing agent, and copper(II) chloride can thereby be used, together with sodium chloride, in raw material leaching. The use of bivalent copper in sulfide raw material leaching is described, for example in U.S. Pat. No. 5,487,819. Similarly, in connection with U.S. Pat. No. 6,007,600, FIG. 3 it is also suggested that a part of the copper(I) chloride solution is oxidized with the aid of chlorine gas into copper(II) chloride and is conducted back to leaching. In the method according to this invention, copper(II) chloride is not first reduced as monovalent and then re-oxidized, but the bivalent copper is precipitated out of a solution containing mainly the copper chloride and thereafter leached as copper(II) chloride so that it can be utilized in copper raw material leaching.

If precipitation of copper(II) chloride is performed in a copper hydro-metallurgical manufacturing process to which is connected alkali electrolysis, the required sodium hydroxide will be obtained as the product of electrolysis. The hydrochloric acid necessary for leaching can also be produced from the hydrogen and chlorine generated in the alkali electrolysis. Sodium hydroxide and hydrochloric acid are, however, inexpensive reagents and they can be used even though they might not be produced in the process.

Copper(II) oxychloride precipitation can be carried out not only with the aid of sodium hydroxide: it is also possible—and economical—to be done with the aid of limestone, $CaCO_3$. As is well-known, limestone is a cheap reagent. Then, instead of reaction (1), the following reaction takes place:

$$2CuCl_2+1.5CaCO_3+1.5H_2O=>Cu_2Cl(OH)_3+\\1.5CaCl_2+1.5CO_2 \tag{3}$$

When the copper raw material is a sulfidic material such as sulfide concentrate, the final product will be an iron-bearing precipitate, which also contains the sulfur contained in the concentrate, mainly as elemental sulfur. Part of the sulfur may oxidize, however, and form sulfates in the solution. When copper(II) oxychloride precipitation is performed with the aid of limestone, the calcium chloride produced in the precipitation removes the sulfates from the copper(I) chloride solution according to the following reaction:

$$Ca^{2+}+SO_4^{2-}+nH_2O=>CaSO_4H_2O \tag{4}$$

In practical tests, it has been found that, in addition to bivalent copper precipitation, iron precipitation also takes place. Thus, by means of alkaline copper chloride precipitation, it is possible to remove the sulfates and iron, as well as the bivalent copper, from copper(I) chloride solution. Copper(II) oxychloride precipitation, or alkaline copper(II) chloride precipitation, can be carried out in two stages, where sodium hydroxide is used as the reagent in one stage and limestone in the other. When the iron and sulfates are already removed at this stage, they do not disturb the solution purification, where the copper(I) chloride solution is purified of other metals in order to achieve metallic copper with as high purity as possible.

When a copper raw material such as sulfide concentrate is leached with chloride solution, forming a copper chloride solution of which the further processing is based on monovalent copper chloride treatment, it is preferable to remove the bivalent copper from the solution as thoroughly as possible. A means for the reduction of bivalent copper has previously been presented, and above is described the precipitation of bivalent copper. In some cases it is, however, preferable to combine these two separation methods in such a way, that part of the bivalent copper is removed, for example with the aid of scrap copper, and the rest is removed by precipitation in the manner described above.

The invention is described further by means of the enclosed example:

EXAMPLE

Copper(II) oxychloride precipitation was carried out in a continuously-operating, laboratory-scale arrangement. The equipment included two consecutive mixing reactors, R1 and R2. The operating temperature was 80° C. and the delay 2 h/reactor.

The feed solution, the contents of which can be seen in Table 1, was conducted to the first reactor, R1. The NaCl content of the feed solution was 300 g/l. A precipitation reagent containing 250 g/l $CaCO_3$ and 150 g/l NaCl, was fed into reactor R1. The amount of limestone was according to the stoichiometry of reaction (3). A precipitation reagent containing 160 g/l NaOH and 150 g/l NaCl was fed into reactor R2, so that the pH of the reactor remained at the value of 4.

The concentrations of the product solution obtained from the latter reactor, R2, can be seen in Table 1. It can be seen from the results that copper(II) oxychloride precipitation removed totally the bivalent copper and iron and also 80% of the sulfates from the copper chloride solution. Zinc, on the other hand, did not essentially precipitate at all, and it should be removed in connection with solution purification.

TABLE 1

| | pH | Cu g/l | $Cu^{1+}$ g/l | $Cu^{2+}$ g/l | Fe g/l | Zn g/l | $SO_4$ g/l |
|---|---|---|---|---|---|---|---|
| Feed solution | 2 | 76.6 | 56.2 | 20.4 | 4.3 | 5.5 | 17.0 |
| Product solution | 4 | 59.0 | 58.9 | 0.1 | 0.03 | 4.7 | 3.3 |

Alkaline copper chloride and gypsum were identified by X-ray diffraction from the deposit obtained from reactor R2. The copper(II) oxychloride sediment was recovered as thickened slime. The slime was leached at a temperature of 25° C. in HCl solution, so that the pH was maintained at a value of 0.7 for about an hour. The slime was easy to dissolve, and the leaching waste contained about 0.5% copper.

The invention claimed is:

1. A method for the removal of copper(II) chloride from a mainly copper(I) chloride solution, said solution having been formed by countercurrently leaching a sulfidic copper raw material into a chloride-bearing solution, said method comprising;
    a) removing the copper(II) chloride contained in said solution by precipitation under atmospheric pressure as, at least partly, alkaline copper(II) chloride, resulting in a solution comprising copper(I) chloride;
    b) conducting said copper(I) solution of step a) to further treatment for producing metallic copper; and
    c) leaching said alkaline copper(II) chloride of step a) to form a solution comprising copper(II) chloride, and conducting said copper(II) chloride solution to said sulfidic copper raw material leaching.

2. A method according to claim 1, wherein copper(II) chloride is precipitated from a copper chloride solution as alkaline copper(II) chloride with the aid of sodium hydroxide, NaOH.

3. A method according to claim 1, wherein copper(II) chloride is precipitated from a copper chloride solution as alkaline copper(II) chloride with the aid of limestone, CaCO3.

4. A method according to claim 1, wherein the iron contained in the copper chloride solution is removed.

5. A method according to claim 1, wherein the sulfate contained in the copper chloride solution is mainly removed.

6. A method according to claim 1, wherein copper(II) chloride is precipitated from a copper chloride solution as alkaline copper(II) chloride with the aid of limestone, CaCO3, and sodium hydroxide, NaOH.

7. A method according to claim 1, wherein bivalent copper is removed by reduction from the copper chloride solution, first with a copper-bearing material and thereafter by precipitation of the remaining bivalent copper as alkaline copper(II) chloride.

8. A method according to claim 1, wherein the alkaline copper(II) chloride formed is leached as its own process step.

9. A method according to claim 1, wherein that the alkaline copper(II) chloride formed is leached in connection with copper raw material leaching.

* * * * *